F. F. MATTMANN.
AUTOMOBILE BOAT.
APPLICATION FILED JAN. 14, 1915.

1,158,704.

Patented Nov. 2, 1915.
2 SHEETS—SHEET 1.

WITNESSES

INVENTOR
F. F. Mattmann,
By
Pigeon Piguet Davis
Attorneys

F. F. MATTMANN.
AUTOMOBILE BOAT.
APPLICATION FILED JAN. 14, 1915.

1,158,704.

Patented Nov. 2, 1915.
2 SHEETS—SHEET 2.

WITNESSES
C. Patenaude
Mb. Patenaude

INVENTOR
F. F. Mattmann

By
Pigeon Pigeon Davis
Attorneys

UNITED STATES PATENT OFFICE.

FRANK FREDRICH MATTMANN, OF MONTREAL, QUEBEC, CANADA.

AUTOMOBILE BOAT.

1,158,704.  Specification of Letters Patent.  Patented Nov. 2, 1915.

Application filed January 14, 1915. Serial No. 2,185.

*To all whom it may concern:*

Be it known that I, FRANK FREDRICH MATTMANN, a subject of the King of Great Britain, and resident of the city of Montreal, Province of Quebec, in the Dominion of Canada, have invented certain new and useful Improvements in Automobile Boats; and I do hereby declare that the following is a full, clear, and exact description of the same.

The invention relates to an "automobile boat" as hereinafter fully described with the aid of the accompanying drawings in which—

Figure 4:
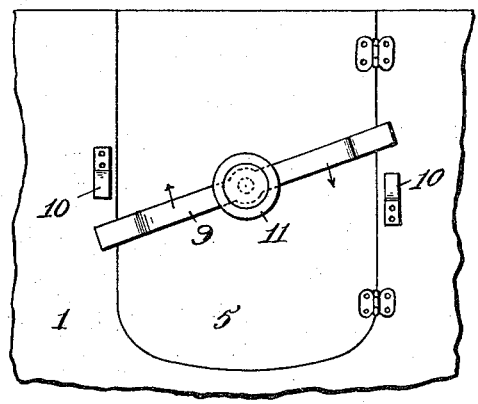
Figure 5:
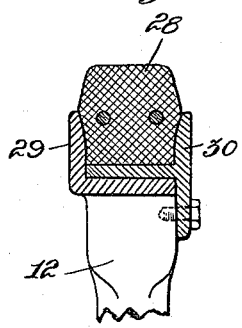
Figure 6:
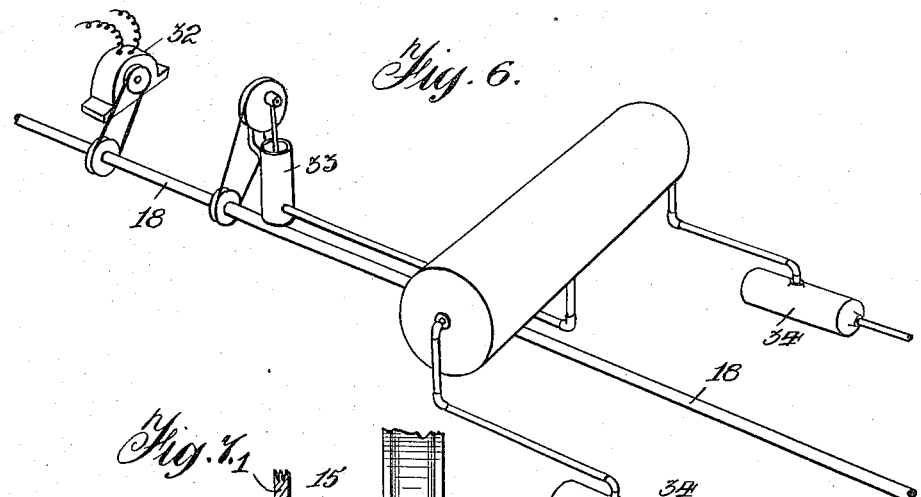
Figure 7:
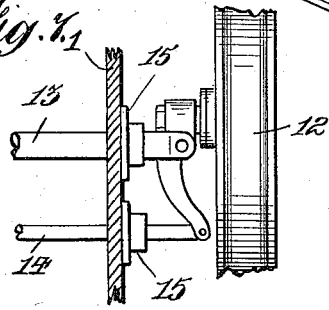

Figure 1 is a side elevation of the automobile boat according to the invention. Fig. 2 is a sectional perspective view of the boat at an intermediate part. Fig. 3 is a detail side view of the propelling mechanism. Fig. 4 is an inside elevation of the door locking means. Fig. 5 is a cross section through the rim of one of the wheels. Fig. 6 is a diagrammatic view of the brake mechanism. Fig. 7 is a sectional plan view of one side of the body adjacent to the front wheels.

The object of the invention is to devise a mechanism capable of travel on land or in water and which will therefore be of great use for warfare and pleasure purposes.

Some of the principal features of the invention are a body in the form of a boat hull having water tight doors in its sides and an engine at the front and with a common driving shaft for water and land extending longitudinally to and through the rear end which is provided with a worm drive to the rear wheels and a propeller for water drive. Spring wheels support the hull on land at each end and the axle of the front wheels extends through packing glands in the hull.

The use of spring wheels in a machine of this description is a very useful feature as the necessary resiliency for travel on land is thus obtained in an extremely effective manner permitting great simplicity in the construction and arrangement of the driving and steering mechanism.

Referring to the drawings, 1 indicates the body having the counter 2 at the rear end beneath which the rear axle 3 extends and the propeller 4 rotates.

The body 1 is very much the same shape as an ordinary boat, but is provided with water tight doors 5 in its sides providing an entrance to the body. The openings for the doors are each provided with flanges 6 extending therearound on the outside and having a washer 7 inside of said flanges. Each door 5 has a flange 8 all around adapted to abut the washer 7 in the closed position to form a water tight joint. The doors 5 are supported by hinges on one side and are each clamped to the closed position by a locking bar 9 engaging the staples 10 secured to the inside of the body on opposite sides of the door opening. The central portion of this bar is screw threaded and a bolt is pivoted on the door and provided with a screw threaded shank engaging the thread of the bar. The bolt is operated by the hand wheel 11 forming the head thereof. The locking bar 9, it will be seen must be turned so as to disengage the staples in order to open the door. To close said door, the ends of the bar 9 must engage the staples 10 and the hand wheel 11 on one end of the bolt is rotated, while the other end of the said bolt will hermetically push the door closed as the thread will engage the central screw portion of the locking bar.

12 are the front wheels mounted at the ends of a front axle 13 and steered by a steering rod 14 in the same manner as an automobile, but in this case the axle and the steering rods extend through packing glands 15.

It must be noted that there are no supporting springs on the front axle which has no lateral movement relative to the body, the necessary resilience for travel on land being obtained through the medium of the wheels which are spring wheels of any well known construction such as shown.

The counter 2 provides the wall 16 at the rear end of the boat to which is attached a gland 17 through which the driving shaft 18 projects, said shaft extending along the bottom of the boat and being driven by a suitable engine at the front end. The outer end of the driving shaft 18 is provided with a worm 19 engaging a gear 20 rigidly mounted on the rear axle 3, said worm and gear being suitably inclosed in the case 21. Between the case 21 and the wall 16 the propeller 4 is rigidly mounted on the shaft 18.

23 is a rudder at the rear end of the body, suitably operated from the aforesaid front wheel steering gear.

24 are the rear wheels rigidly mounted at the ends of the rear axle 2 and of similar spring construction to the front wheel 12.

The mud guards 25 and platform 26 are secured to the body by the hinges 27 in order that they may be folded back against the side of the body when the device is used as a boat.

The spring wheels 12 and 24 are provided with detachable rubber treads 28 each fitting in a groove formed by a flange 29 and a detachable flange 30, in order that the machine might be used on railway rails when the tire 28 and flange 30 are taken off.

For electrically lighting the lamps 31, a drive may be taken from the shaft 18 to an electric dynamo 32 and another drive may be also obtained from the same shaft to an air pump 33 for supplying air to the cylinders 34 of a brake apparatus operating a band 35 on the rear axle 3.

In the present invention, the parts outside the body are reduced to a minimum owing to the provision of axles rigid with the body and the provision of spring wheels, and I wish it to be understood that the details not mentioned herein may be anything suitable so long as the main features are adhered to as claimed in the following claims for novelty.

The front wheels may be mounted at the ends by brackets extending from the side of the hull instead of on an axle extending through the hull and in this arrangement only the steering rod would need to extend through packing glands.

What I claim is:—

1. In an automobile boat for use on land and water, the combination of a hull having a counter at the rear, an engine mounted in the hull, opposite stuffing boxes in the sides of said hull, a front axle extending through said stuffing boxes and spring wheels mounted at the ends of said axle, a rotatable rear axle extending across the hull beneath said counter and rigid means for supporting said hull on the axle, spring wheels on the ends of said rear axle, a driving shaft rotated by said engine and extending through the hull beneath said counter, a propeller rigidly mounted on said shaft, worm driving means between said shaft and rear axle and suitable steering means.

2. In an automobile boat for use on land and water, the combination of a hull, an engine mounted in the hull, opposite pairs of stuffing boxes in the sides of said hull at the front end, a front axle extending through one opposite pair of stuffing boxes, and spring wheels mounted at the ends of said axle, steering means including a steering rod extending through the other opposite pair of stuffing boxes, a rear axle and rigid supporting means therefor, spring wheels on the ends of said axle, a driving shaft extending from said engine through the hull beneath said rear axle, worm driving means between said driving shaft and axle, a propeller mounted on the projecting end of said driving shaft and a rudder operatively connected to the aforesaid steering means.

Signed at Montreal, Quebec, Canada, this 16th day of September, 1914.

FRANK FREDRICH MATTMANN.

Witnesses:
M. PATENANDE,
CHEFEBOE.

Copies of this patent may be obtained for five cents each, by addressing the "Commissioner of Patents, Washington, D. C."